United States Patent
Demsky et al.

(10) Patent No.: US 7,403,955 B2
(45) Date of Patent: Jul. 22, 2008

(54) METHOD AND SYSTEM FOR UPDATING ATTACHMENT FILES

(75) Inventors: Scott H. Demsky, Boca Raton, FL (US); William R. Ferguson, Boca Raton, FL (US); Robert M. Szabo, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/103,229

(22) Filed: Mar. 21, 2002

(65) Prior Publication Data

US 2003/0182323 A1    Sep. 25, 2003

(51) Int. Cl.
*G06F 17/30* (2006.01)

(52) U.S. Cl. ............... 707/104.1; 707/10; 709/203; 709/219

(58) Field of Classification Search ........... 707/203, 707/200, 10, 104.1; 709/206, 203, 219; 715/700
See application file for complete search history.

(56) References Cited

U.S. PATENT DOCUMENTS

| | | | | |
|---|---|---|---|---|
| 5,625,818 A * | 4/1997 | Zarmer et al. | ............ | 707/104.1 |
| 5,706,510 A * | 1/1998 | Burgoon | ............ | 707/203 |
| 5,771,355 A * | 6/1998 | Kuzma | ............ | 709/232 |
| 5,875,476 A | 2/1999 | Nijboer | ............ | 711/159 |
| 5,903,723 A * | 5/1999 | Beck et al. | ............ | 709/200 |
| 5,983,277 A | 11/1999 | Heile et al. | ............ | 709/232 |
| 6,061,693 A | 5/2000 | Carney et al. | ............ | 707/200 |
| 6,151,624 A * | 11/2000 | Teare et al. | ............ | 709/217 |
| 6,192,375 B1 * | 2/2001 | Gross | ............ | 707/200 |
| 6,237,091 B1 | 5/2001 | Firooz et al. | ............ | 713/1 |
| 6,275,848 B1 * | 8/2001 | Arnold | ............ | 709/206 |
| 6,654,746 B1 * | 11/2003 | Wong et al. | ............ | 707/10 |
| 6,687,741 B1 * | 2/2004 | Ramaley et al. | ............ | 709/206 |
| 6,978,276 B2 * | 12/2005 | Demsky et al. | ............ | 707/102 |
| 7,054,905 B1 * | 5/2006 | Hanna et al. | ............ | 709/206 |
| 7,117,210 B2 * | 10/2006 | DeSalvo | ............ | 707/10 |
| 2002/0103758 A1 * | 8/2002 | Powell | ............ | 705/51 |
| 2003/0009528 A1 * | 1/2003 | Sharif et al. | ............ | 709/206 |
| 2003/0028600 A1 * | 2/2003 | Parker | ............ | 709/206 |
| 2003/0078975 A1 * | 4/2003 | Ouchi | ............ | 709/205 |
| 2003/0115273 A1 * | 6/2003 | Delia et al. | ............ | 709/206 |

* cited by examiner

*Primary Examiner*—Leslie Wong
(74) *Attorney, Agent, or Firm*—Akerman Senterfitt

(57) ABSTRACT

A method of updating a file attached to an electronic document can include attaching a file to an electronic document and storing a reference to the attached file. The reference can specify a location from which the attached file was obtained. Responsive to a user input, the attached file can be replaced with a file specified by the reference. The attached file also can be updated from newly specified locations.

9 Claims, 6 Drawing Sheets

METHOD AND SYSTEM FOR UPDATING ATTACHMENT FILES

BACKGROUND OF THE INVENTION

1. Technical Field

This invention relates to the field of electronic document processing, and more particularly, to the manipulation of attachment files.

2. Description of the Related Art

Presently, many software applications are capable of attaching copies of files to electronic documents. Common examples of such software systems include, but are not limited to, electronic mail systems, database systems, as well as collaborative systems such as Lotus Notes (TM). Once a file is attached to an electronic document, the file as well as the document can be transmitted over a computer communications network to other computer systems. Alternatively, multiple users can access the attached file using suitable collaborative software, typically over a computer communications network, as previously described.

Conventional software systems can manipulate attached files in several ways. For example, the attached file can be viewed with a file viewer, launched or processed by another application, detached from the electronic document and stored as a local file, or in the case of a program file, can be executed. Though a copy of a file can be attached to an electronic document, the original file may be updated from time to time. Presently, to attach an updated copy of an attached file to an electronic document, the original attached file first must be deleted or detached from the electronic document. Next, the user must select an attachment option to attach a copy of the updated version of the originally attached file. The user then can specify a file and the location of the file to be attached to the electronic document. This tedious, multi-step process can involve approximately 3 to 6 steps using conventional software systems, especially if responses to confirmatory messages for deletions or other actions are included. The problem further is exacerbated in the case where multiple attached files must be updated.

SUMMARY OF THE INVENTION

The invention provides a method and system for updating files attached to electronic documents. The present invention enables a user to update an attached file to a more recent version of the file without having to manually delete or remove the attached file from the electronic document, and then re-attach a copy of a more recent version of the originally attached file. The invention further can be used to replace an existing attachment with a different file. As such, the present invention can be used in conjunction with electronic mail systems, database systems, collaborative systems, or any other system in which files can be attached to electronic documents.

One aspect of the present invention can include a method of updating a file attached to an electronic document. The method can include attaching a file to an electronic document. For example, the attaching step can include making a copy of the file to be attached and including the copy of the file with the electronic document. Alternatively, the actual file can be included with the electronic document. A reference to the attached file can be stored. For example, the reference can be stored within the electronic document or can be stored within the attached file itself. The reference can specify a location from which the file was obtained. The reference can specify a fully qualified location of the attached file as well as a file-name. The location can be a local or remote location. For example, the location can be specified as a host and/or file-name as well as a uniform resource locator (URL). In one embodiment, the location can be extracted from within the electronic document to which the file is attached. Responsive to a user input, the attached file can be replaced with a file specified by the reference, for example a different file or an updated version of the originally attached file. Notably, the replacing step can replace the attached file responsive to a single user command.

If the replacing step is unsuccessful, or if the user so chooses, a new location of the file to be used in the updating step can be requested. Accordingly, another embodiment of the present invention can include, prior to the step of replacing the attached file, replacing the reference with a second user specified reference. The second reference can specify a different location of a file to be used in the replacing step. In any case, the method further can include displaying the location of the attached file.

Another aspect of the present invention can include a system for updating a file attached to an electronic document. The system can include a capture processor configured to capture and store the location of an attached file, a graphical user interface configured to display at least one option for updating the attached file from a particular location; and a replacement processor configured to replace the attached file with a file specified by a stored reference. The capture processor further can be configured to display the location of the attached file. Also, the options for updating the attached file can include updating the attached file from a default location and updating the attached file from a new location.

Another aspect of the present invention can include a graphical user interface configured to update a file attached to an electronic document. The graphical user interface can include at least one option for updating the attached file from a particular location. The options for updating the attached file can include updating the attached file from a default location and updating the attached file from a new location.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention provides a method and system for updating files attached to electronic documents. In particular, the present invention enables a user to update an attached file to a more recent version of the file without having to manually delete or remove the attached file from the electronic document and then re-attach a more recent copy of the originally attached file. Accordingly, the present invention provides an efficient method and system for updating files attached to electronic documents.

Figure 1:
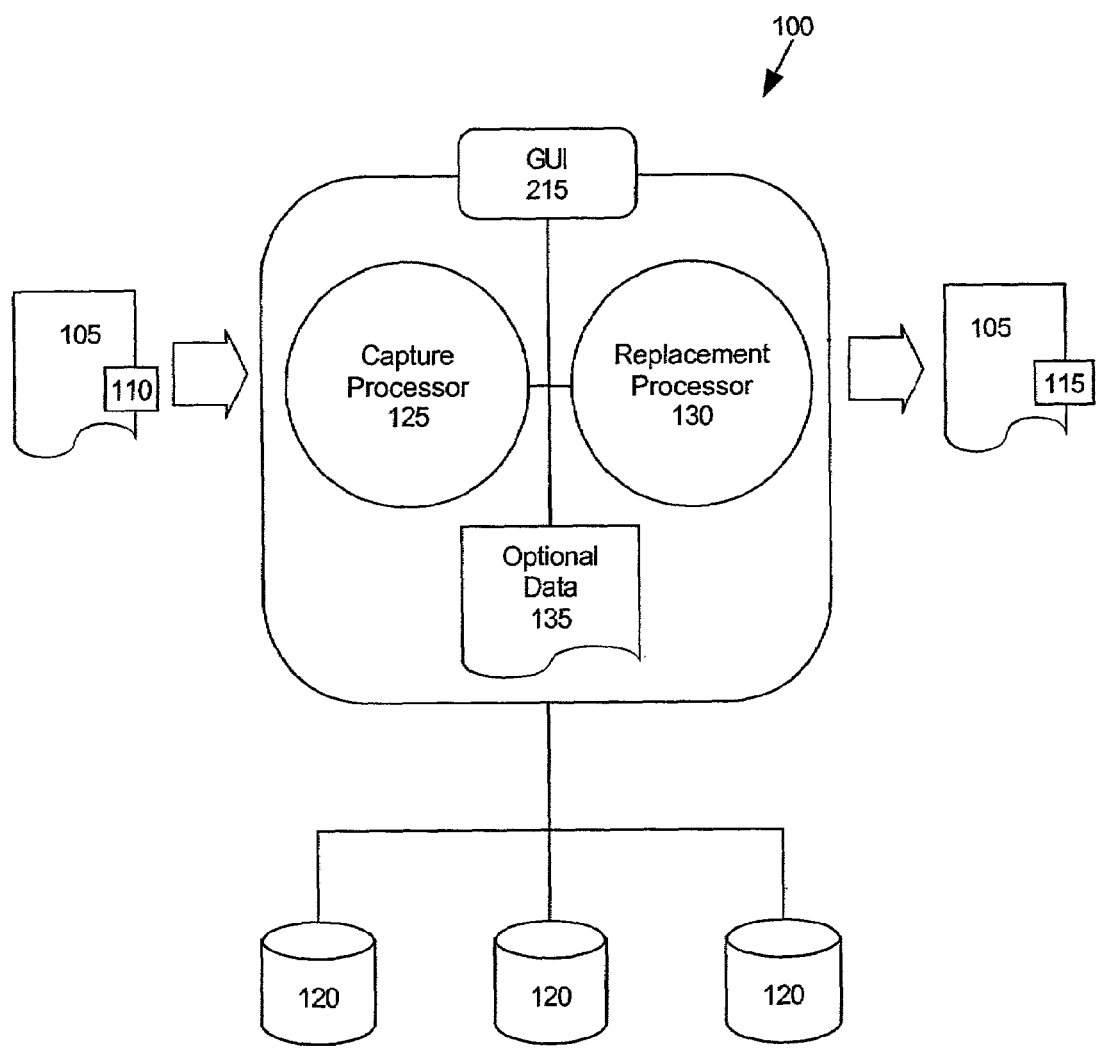
FIG. 1 is a schematic diagram illustrating a system for updating files attached to electronic documents.

FIG. 1 is a schematic diagram illustrating a system 100 for updating files attached to electronic documents. As shown in FIG. 1, an electronic document 105 having a file 110 attached thereto, can be processed by the system 100. In one embodiment, a source file from which the file 110 is created can be located at a default location. A user can select this source file, which can then be copied to create file 110 that is attached to electronic document 105, File 110 can be removed and an updated copy of file 110, in this case file 115, can be attached to the electronic document 105 in place of file 110. That is, the file 115 can be another file created by copying the source file. The file 115 can be obtained from any of a variety of data stores communicatively linked to system 100 such as data stores 120. Notably, the specific location of file 115 can be stored within the electronic document 105, the system 100, or alternatively can be newly specified by a user.

The system 100 can include a capture processor 125, a replacement processor 130, a graphical user interface (GUI) 215, as well as optional data 135. As specified by the user when a file is attached to the electronic document 105, the capture processor 125 can identify and store the location and the filename of the file attachment 110 or the location and file name of the source file from which the file attachment 110 was copied collectively as a default location. The default location can include the fully qualified location and can be a local or remote location. For example, the location can be specified as a host and/or filename as well as a uniform resource locator (URL). The default location can be stored in the optional data 135, can be included within the electronic document 105 to which the file 110 is attached, or can be stored within the attached file 110 itself For example, the default location can be stored within an email, a markup language document, or other electronic document having an attachment. The capture processor 125 further can be configured to display the fully qualified location or any portion theref within a GUI, within the electronic document 105, or within a viewer used to display the electronic document 105.

The replacement processor 130 can be configured to present one or more GUIs, for example GUI 215, which can provide options such as updating one or more attached files 110 from a default location and/or updating one or more attached files from new locations. The replacement processor 130, responsive to a user request to update an attached file, can remove file 110 from the electronic document 105, and attach an updated version 115 of the attached file to the electronic document 105 from the default location. Notably, the default location can be altered by the user such that the updated file 115 can be obtained from a different location than the originally attached file 110.

Although system 100 is depicted as a standalone application program, those skilled in the art will recognize that system 100 can be included as a component of a larger system. For example, the system 100 can be included within a electronic mail program or system, a database program or system, a collaboration program or system, or the like.

Figure 2:
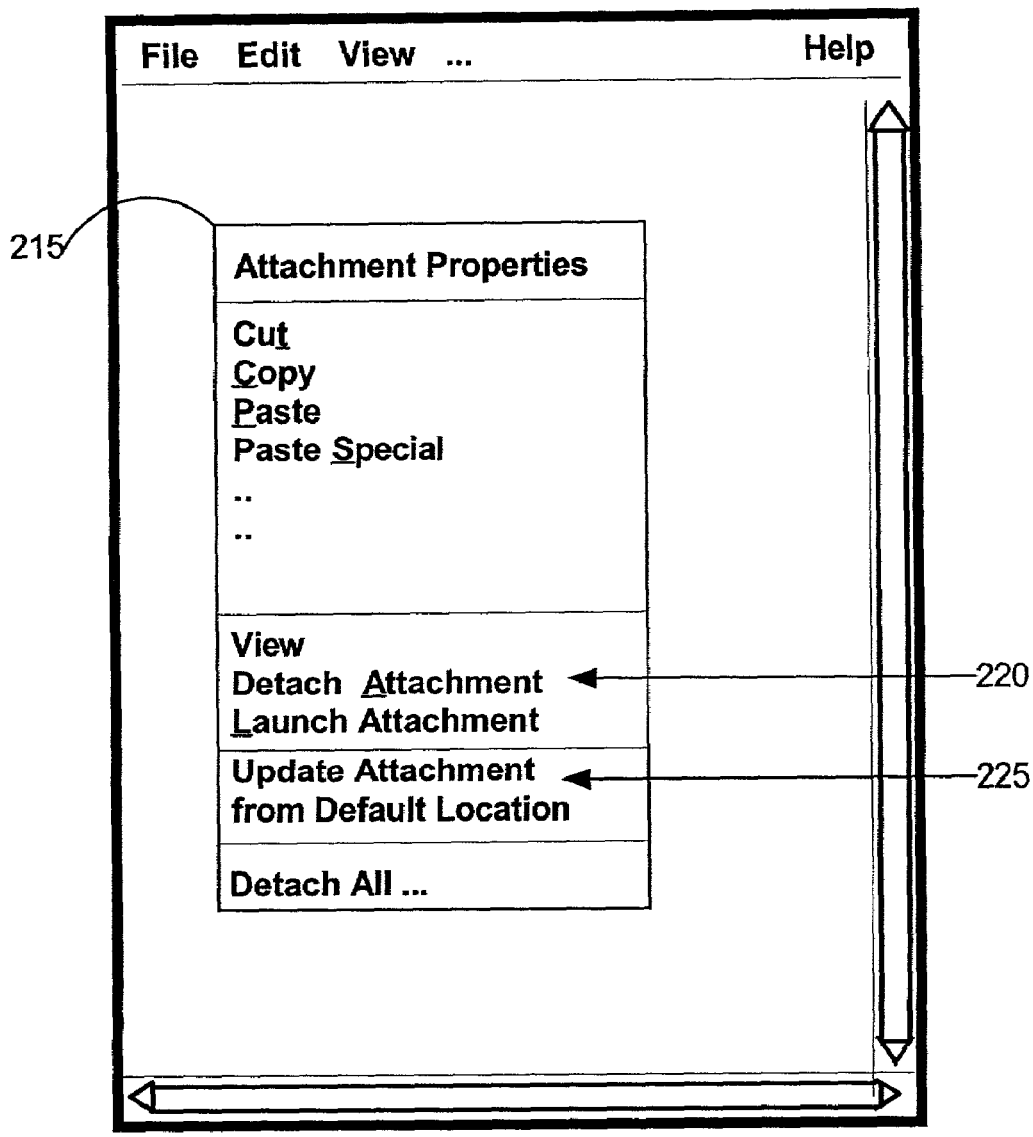
FIG. 2 depicts an exemplary GUI for updating an attachment in accordance with the inventive arrangements disclosed herein.

FIG. 2 depicts one embodiment of the GUI 215 for updating an attachment in accordance with the inventive arrangements disclosed herein. Referring to FIG. 2, GUI 215 can include one or more menu options for manipulating attachments to an electronic document. The GUI 215 can include conventional attachment menu items 220 which include viewing an attachment detaching the attachment, as well as launching the attachment in a designated application. The GUI 215 further can include a menu item 225 for updating an attachment from the default location. Accordingly, upon selection of menu option 225, an updated version of the attached file can be obtained from the default location, in this case the location of a file from which the originally attached file was copied. The attached file then can be replaced with the updated version of the attached file.

Figure 3:
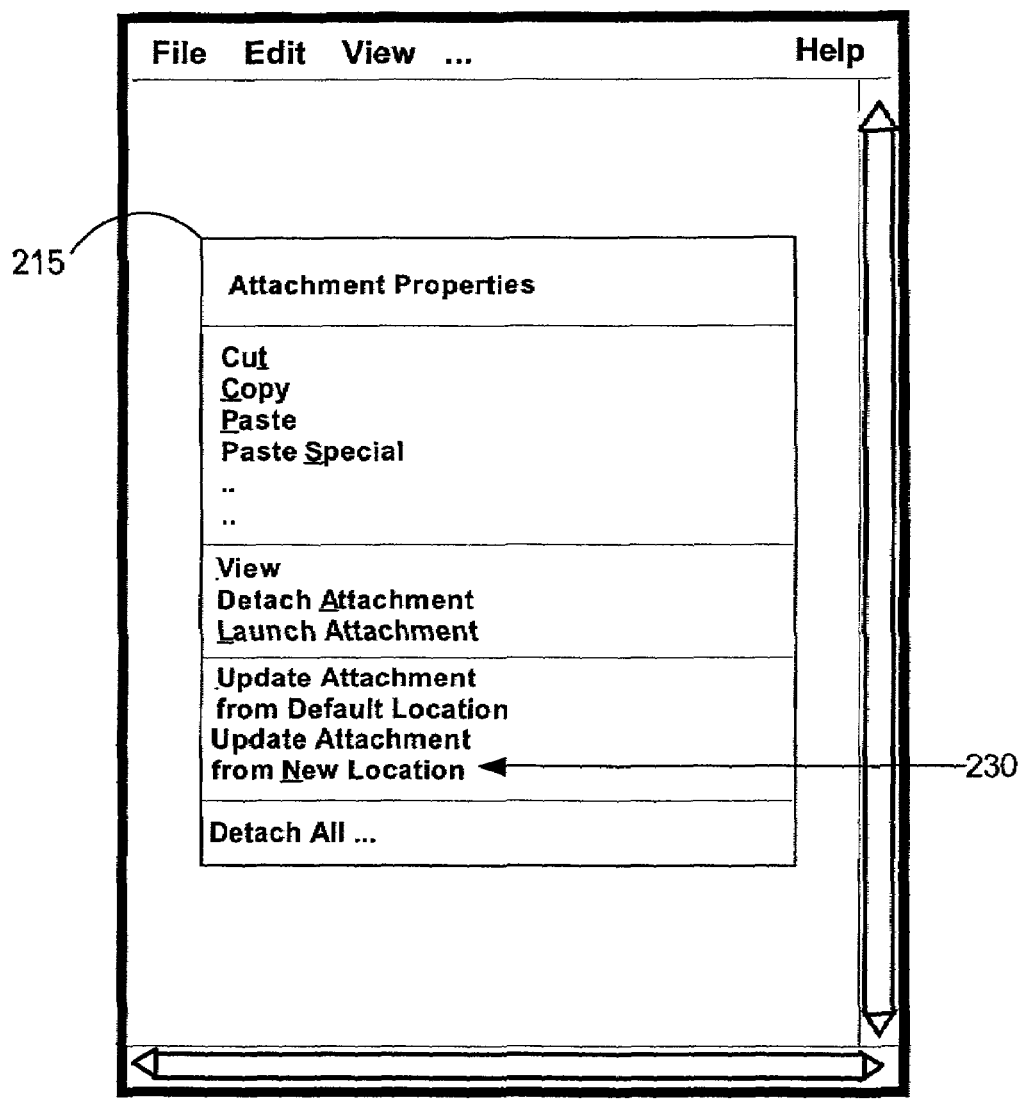
FIG. 3 depicts another exemplary GUI for updating an attachment in accordance with the inventive arrangements disclosed herein.

FIG. 3 depicts another embodiment of the GUI 215 in accordance with the inventive arrangements disclosed herein. As shown in FIG. 3, a menu item 230 for updating an attached file from a location other than the default location is provided. For example, upon selection of menu item 230, a file menu dialog can be presented wherein the user can specify the new location of the updated version of the attached file. Once specified, the new location can be stored as the default location of the attached file.

Figure 4:
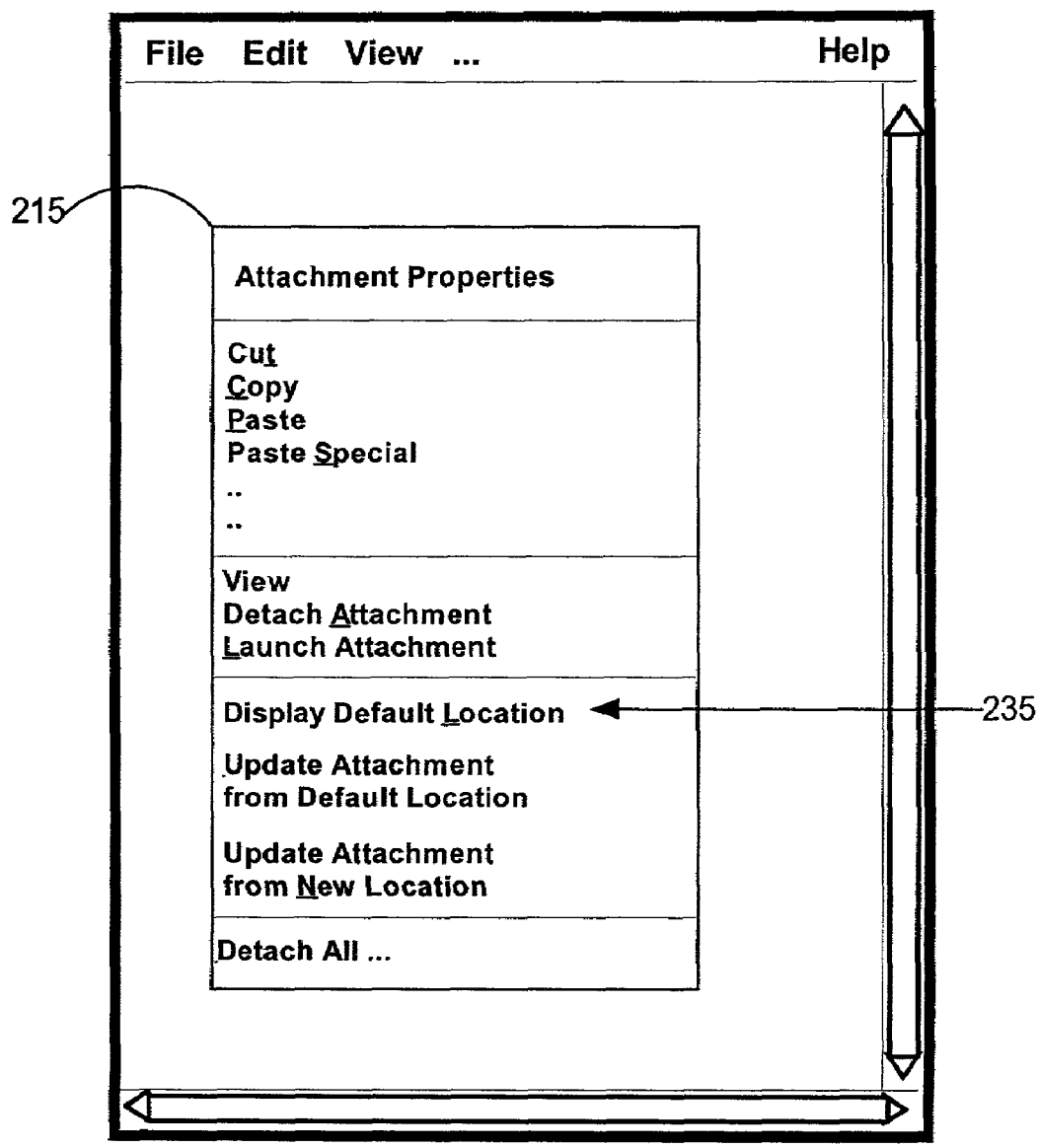
FIG. 4 depicts an exemplary GUI for displaying a default location in accordance with the inventive arrangements disclosed herein.

FIG. 4 depicts another embodiment of the GUI 215 for updating an attachment in accordance with the inventive arrangements disclosed herein. The GUI 215 includes many of the same menu items as previously discussed. An additional menu item 235 has been included in the GUI 215 for displaying the current default location of the attached file. This feature can be particularly useful when distinguishing among several versions of an attached file which may exist throughout a network or larger computer system. Accordingly, upon selecting menu item 235, the default location of a selected attached file can be displayed. Alternatively, the default location of the attached file can be passively displayed under an icon representing the attached file.

If more than one attached file is selected, the location of each selected file can be displayed. In one embodiment of the present invention, the locations can be listed one beneath the other, such that the ordering coincides in some manner with the ordering of the attached selected files. For example, left to right ordering of attached file icons can be translated to a top to bottom ordering of the file locations. Alternatively, the default location can be displayed automatically whenever a pointer passes over an icon representing the attached file. In any case, the invention is not so limited to the particular manner in which file locations are to be displayed.

Figure 5:
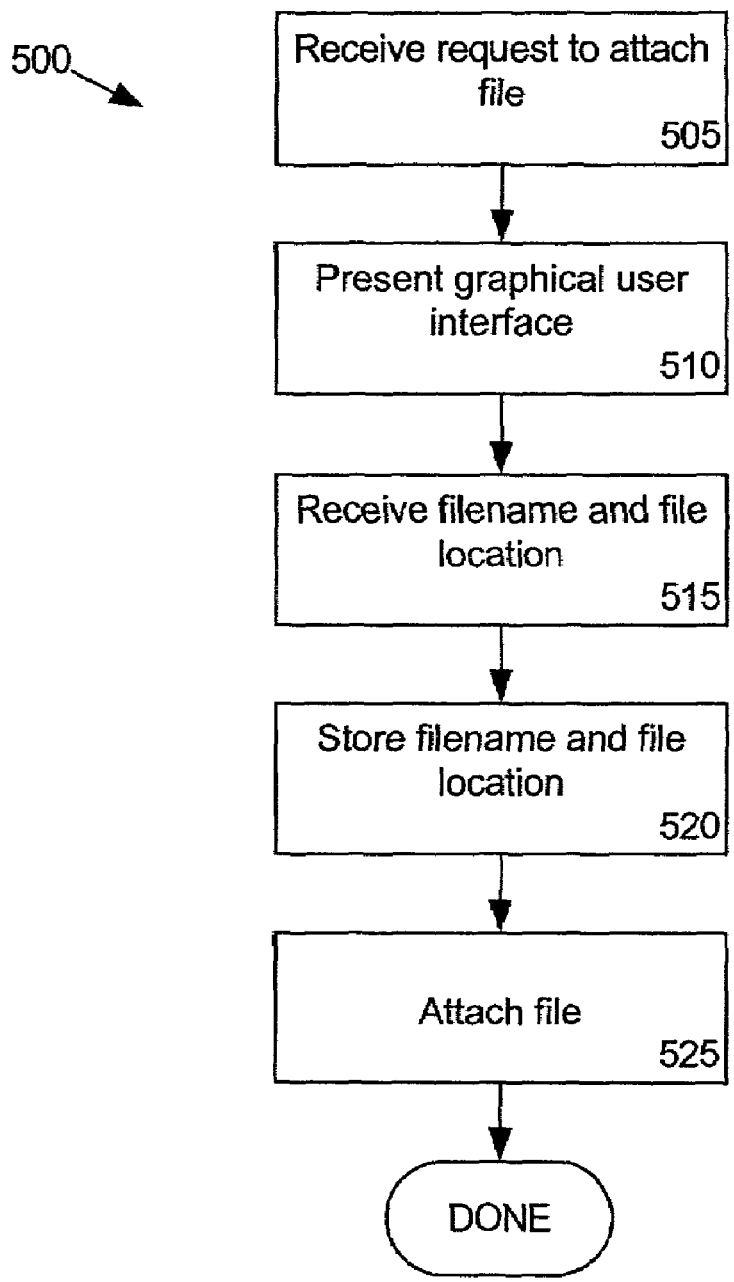
FIG. 5 is a flow chart illustrating a method of attaching a file to an electronic document in accordance with the inventive arrangements disclosed herein.

FIG. 5 is a flow chart illustrating a method 500 of attaching a file to an electronic document in accordance with the inventive arrangements disclosed herein. The method 500 can begin in step 505 where a request to attach a file to an electronic document can be received. In step 510, a GUI can be presented which enables a user to identify a particular file to be attached to the electronic document and the location of the file. In step 515, the filename and the location of the file can be received from the user. In step 520, the filename and the location of the file, collectively the default location, can be stored for later use. As mentioned, the default location can be stored within the electronic document itself, within the attached file, within a data set of an application program, or the attachment updating system. In step 525, the specified file can be attached to the electronic document. For example, a copy of the file to be attached can be made and then included with or attached to the electronic document. Alternatively, the originally identified file to be attached can be included with the electronic document.

Figure 6:
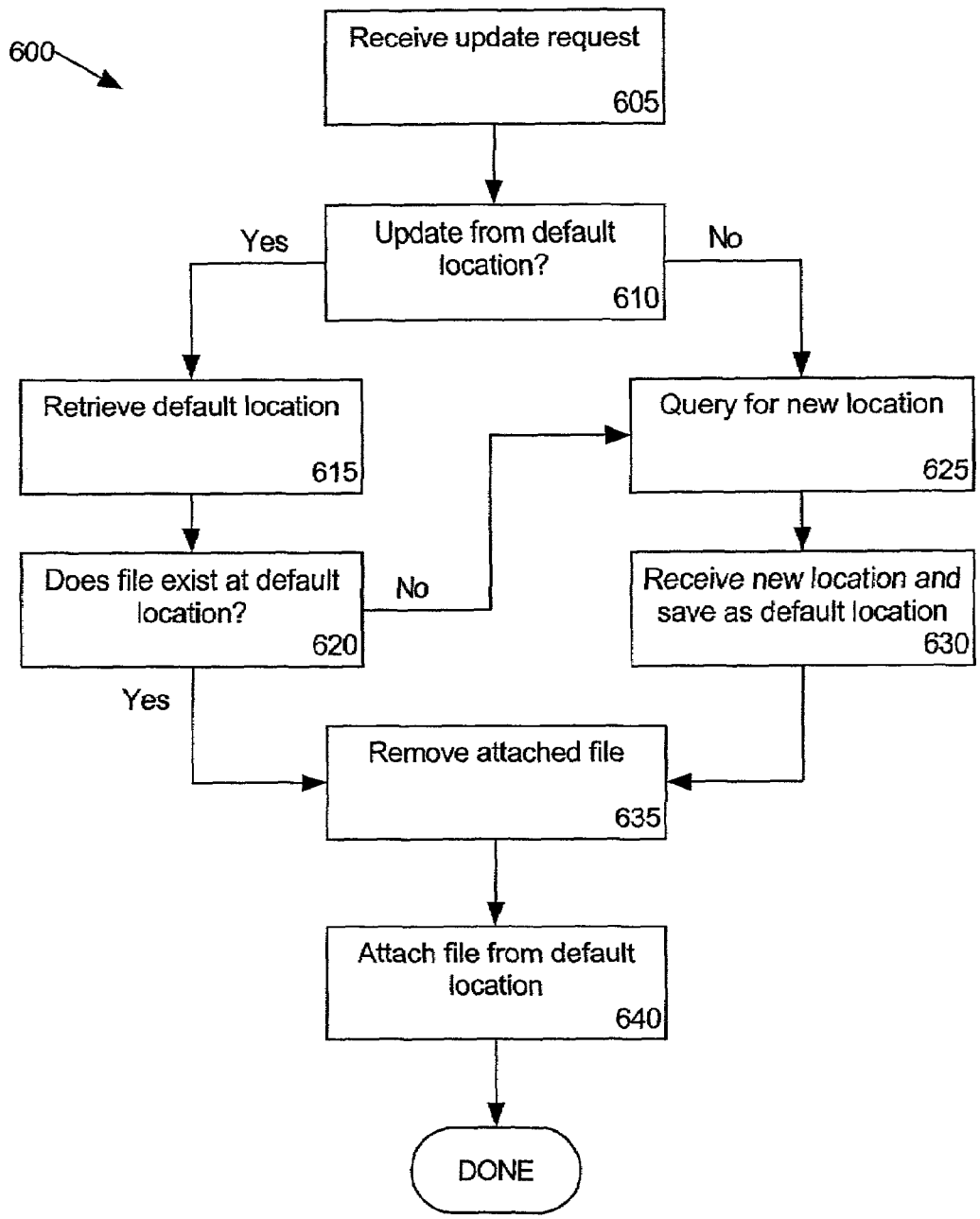
FIG. 6 is a flow chart illustrating a method of updating a file in an electronic document in accordance with the inventive arrangements disclosed herein.

FIG. 6 is a flow chart illustrating a method 600 of updating a file in an electronic document in accordance with the inventive arrangements disclosed herein. The method 600 can begin in a state wherein a file has already been attached to an electronic document, for example as described in the method of FIG. 5. Accordingly, the method 600 can begin in step 605 where a request to update one or more attachments has been received after an attached file has been selected.

Proceeding to step 610, a determination can be made as to whether the request was to update from the default location. If so, the method can continue to step 615. If not, the method can continue to step 625. In step 615, the default location can be retrieved. For example, depending upon the implementation, the default location can be retrieved from the electronic document or from a data store operatively connected to a computer communications network. After retrieving the default location, the method can continue to step 620, where a determination can be made as to whether an updated version of the attached file exists at the default location. If not, for example if the file has been moved or deleted, the method can continue to step 625. If so, however, the method can continue to step 635.

In step 625, where the user requested the attached file be updated from a newly specified location, or where the attached file was not found at the default location, the user can be queried for a new location. In step 630, the newly specified location, the location designating the updated version, or a new file to replace the originally attached file, can be received. The new location then can be saved as the default location thereby replacing the previously specified default location. After completion of step 630, the method can continue to step 635.

In step 635, the originally attached file can be removed or detached from the electronic document. Thus, in step 640, the updated version of the originally attached file, which can include a new file replacing the previously attached file and having a same name as the original file, can be attached to the electronic document as specified by the default location.

It should be appreciated by those skilled in the art, that in the case where multiple files have been attached to an electronic document, the user can select one or more of the attached files. Accordingly, the user then can select the "update from default location" to update each of the attached files in a single step rather than individually selecting the "update from default location" for each attached file individually. Notably, depending upon the location of the originally attached files, each of the attached files can be updated from a single location or each file can be updated from its own respective location. Additionally, multiple attached files can be updated from a new location if the location is the same for each of the files being updated. In any case, it should be appreciated that the GUIs disclosed herein can be embodied in other forms. For example, individual single action activatable icons can be provided for each of the attachment updating functions disclosed herein. Thus, a user can update one or more attached files from a default location with a single action.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of updating a file attached to an electronic document, the method comprising:
    attaching a file to an electronic document;
    storing a reference associated with the attached file, wherein the reference specifies a location of a document data store in a computer communications network from which the attached file was obtained, and wherein the reference is stored within at least one among the attached file and the electronic document;
    after said attaching step, transmitting said attached file and said electronic document over the computer communications network to a computer system of a recipient; and
    responsive to the recipient accessing the stored reference and determining that an alternate to the attached file is available at the location in the stored reference, replacing the attached file transmitted to said computer system with the alternate file stored in the location specified by said reference.

2. The method of claim 1, said attaching step comprising:
    receiving a user identification of a particular file and a location for said particular file;
    making a copy of the user identified file; and
    including said copy of said user identified file with said electronic document,
    wherein said copy is said attached file and wherein said reference specifies the location for said particular file.

3. The method of claim 1, said attaching step comprising:
    receiving a user identification of a particular file and a location for said particular file, wherein said particular file is said attached file and wherein said reference specifies the location for said particular file.

4. The method of claim 1, wherein said replacing step automatically replaces the attached file responsive to the recipient accessing the stored reference.

5. The method of claim 1, said replacing step comprising:
    replacing said attached file with an alternate file selected from a group consisting of an updated version of the attached file and a different file.

6. The method of claim 5, further comprising:
    prior to said step of replacing the attached file, replacing said stored reference with a second user specified reference, said second reference specifying a different location of an alternate file to be used in said replacing step.

7. The method of claim 1, further comprising:
if said replacing step is unsuccessful due to no alternate file being found at the location specified by said reference, requesting a new location of the alternate file to be used to replace said attached file.

8. The method of claim 1, wherein said storing step comprises storing a fully qualified location and a filename.

9. The method of claim 1, further comprising:
displaying said location specified in the stored reference to the recipient.

* * * * *

UNITED STATES PATENT AND TRADEMARK OFFICE
CERTIFICATE OF CORRECTION

PATENT NO. : 7,403,955 B2  
APPLICATION NO. : 10/103229  
DATED : July 22, 2008  
INVENTOR(S) : Scott H. Demsky, William R. Ferguson and Robert M. Szabo Page 1 of 1

It is certified that error appears in the above-identified patent and that said Letters Patent is hereby corrected as shown below:

Title Page, Item (45) Please add an asterisk (*) before Jul. 22, 2008

Title Page, (*) Please add: This patent is subject to a terminal disclaimer.

Signed and Sealed this  
Sixteenth Day of April, 2013

Teresa Stanek Rea  
*Acting Director of the United States Patent and Trademark Office*